United States Patent [19]

Buzza et al.

[11] Patent Number: 4,915,713
[45] Date of Patent: Apr. 10, 1990

[54] LIQUID DEGASSING SYSTEM AND METHOD

[75] Inventors: Edmund Buzza; Samuel Ricchio, both of Fullerton, Calif.

[73] Assignee: Beckman Instruments, Inc., Fullerton, Calif.

[21] Appl. No.: 322,810

[22] Filed: Mar. 13, 1989

[51] Int. Cl.$^4$ ............................................. B01D 19/00
[52] U.S. Cl. ............................................. 55/55; 55/189; 55/270
[58] Field of Search ......................... 55/270, 55, 189

[56] References Cited

U.S. PATENT DOCUMENTS

| | | | |
|---|---|---|---|
| 2,151,644 | 3/1939 | Stephens | 99/155 |
| 2,182,724 | 12/1939 | Hennessy | 137/78 |
| 2,837,318 | 6/1958 | Winternitz | 257/29 |
| 3,460,319 | 8/1969 | Tkach | 55/19 |
| 3,608,272 | 9/1971 | Di Peri | 55/15 |
| 3,778,969 | 12/1973 | Sudduth | 55/55 |
| 4,572,724 | 2/1986 | Rosenberg et al. | 55/159 |

FOREIGN PATENT DOCUMENTS

| | | |
|---|---|---|
| 108266 | 5/1984 | European Pat. Off. |
| 206119 | 12/1986 | European Pat. Off. |
| 444122 | 2/1968 | Fed. Rep. of Germany |
| 2117873 | 10/1983 | United Kingdom |

*Primary Examiner*—Bernard Nozick
*Attorney, Agent, or Firm*—William H. May; Arnold Grant; Gary T. Hampson

[57] ABSTRACT

A liquid degasser includes a debubbler chamber connected in a line from a reservoir. Degassed liquid is fed from the chamber via a sensing electrode back to the reservoir. Fluid is drawn into the debubbler chamber at a first volume of flow rate, and gas is removed at a second, slower volume of rate. Degassed liquid is pumped from the base of the chamber through the sensing electrode and fed back to the reservoir. The gases from the debubbler chamber are returned directly to the reservoir.

17 Claims, 1 Drawing Sheet

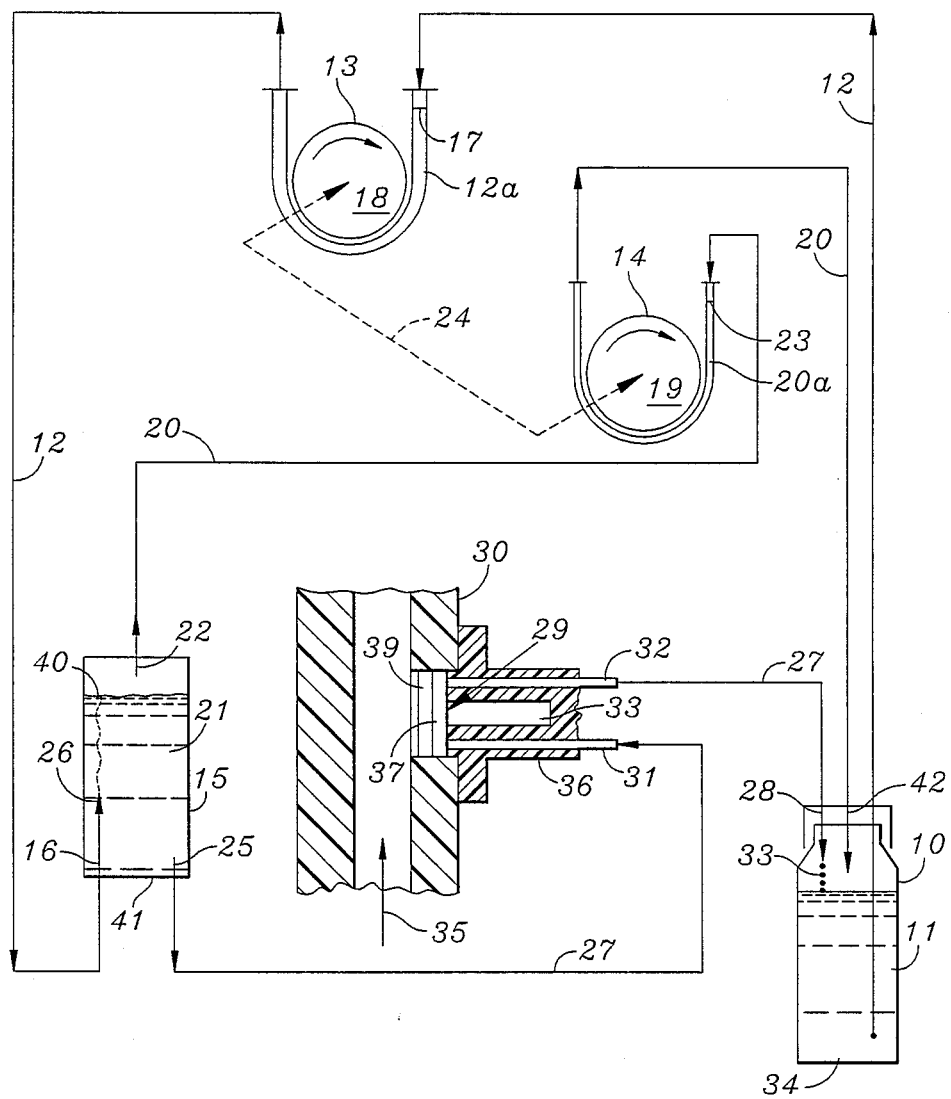

LIQUID DEGASSING SYSTEM AND METHOD

RELATED APPLICATIONS

This invention relates to the inventions and disclosures which are the subject of Application Ser. Nos.:
Application Ser. No. 322,814;
Application Ser. No. 322,802;
Application Ser. No. 322,811;
Application Ser. No. 22,812;
Application Ser. No. 322,813; and
Application Ser. No. 322,807.

All these applications are filed contemporaneously with the present application.

BACKGROUND

This invention relates to automatic clinical analyzers for chemistry measurement. In particular, the invention relates to a system of removing gas or bubbles from fluid which is used in such instruments.

Different automatic clinical chemistry analyzers are known, each having different desirable attributes and advantages. One analyzer uses a plurality of individual analysis modules having open reaction cups. Automatic samples probes withdraw sample volume from samples carried on a carousel and distributes the sample volume to analysis modules in accordance with selected tests. In another analyzer, the sample fluids are directed into a flow cell together with a diluent. Electrolytes in the fluid are determined in the flow cell.

In the various analyzers different fluids react with the sample fluid in the reaction cups. In a flow cell, it is necessary to have an alkaline buffer pass through a zone of the flow cell behind a gas permeable member in a manner which is substantially bubble-free so that a $CO_2$ measurement can be accurately determined.

Different systems are known for removing the bubbles from alkaline buffer agents to permit $CO_2$ measurement through a permeable membrane. The known systems are relatively complex and require multiple pumps to ensure effective operation with a minimum of downtime. Also, difficulties arise with regard to purging air, gas or bubbles from the system at start-up.

The present invention seeks to overcome the drawbacks with existing systems for debubbling or removing gas or air from liquid.

SUMMARY

By the present invention, a system is provided for debubbling liquid such as alkaline buffering agents for analyzers. This invention overcomes the drawbacks of existing systems. The system uses a simple pump arrangement and is self-purging.

According to the present invention, a system for removing gas from a liquid, preferably debubbling the liquid, comprises a liquid reservoir. The bubbles are formed by gas or air which may be partly entrapped in the liquid. There is means for feeding a liquid from the reservoir at a first volume rate and for directing the liquid at the first volume rate to a chamber. A tube connected with the chamber removes gas, air or bubbles from the liquid through a first outlet from the chamber. The tube feeds the removed gas, air or bubbles to the reservoir at a second lower volume rate.

There is a means for drawing the gas reduced liquid, namely, debubbled liquid, from a chamber second outlet and directing the substantially bubble reduced liquid flow to the flow cell and subsequently to the reservoir.

The means for directing the bubble reduced liquid flow to the reservoir passes the liquid flow through a sensing chamber before entering the reservoir. The liquid in the reservoir is recycled to the chamber and reservoir. The sensing chamber is preferably an electrode for $CO_2$ in a flow cell.

In a preferred form, the means for drawing the liquid at the first volume rate feeds from substantially the base of the reservoir into the base of the chamber. The gas is preferably removed from the top of the chamber at a second reduced volume rate. The tube feeds removed gas into the top of the reservoir. The gas reduced liquid flow is directed from the base of the chamber into the top of the flow cell. The first volume rate is such that the liquid level in the chamber is maintained above the inlet of liquid from the reservoir. The gas reduced liquid outlet flow from the chamber into the reservoir is maintained at a relatively steady stream flow rate. The second flow rate is less than the first flow rate. In steady state operation the chamber is filled and gas laden liquid exits the chamber from the top.

The means for drawing liquid includes peristaltic pumps for developing the first and second volume rates, the umps being linked. The first and second volume rates are achieved by using two different diameter tubes on the peristaltic pump. The larger tube supplies the flow to the chamber, and the smaller tube pumps the gas from the top of the chamber. The difference in the two flows is directed to the flow cell.

The invention is further described with reference to the accompanying drawing.

DRAWING

FIG. 1 is a fluid stream debubbler flow chart diagrammatically illustrating components of the system, the tube in the system being represented as a single line.

DESCRIPTION

A liquid stream debubbler system for removing gas or air entrained in a liquid comprises a liquid reservoir 10 which contains liquid 11. Means for feeding liquid 11 from the reservoir 10 at a first volume rate includes a tube 12 operated through a peristaltic pump 13. The tube 12 connects into the base 41 of a chamber 15 and extends partly upwardly for a predetermined height as indicated by line 16 from the base 41 of the reservoir 15. The tube 12 connects with a portion 12a which is indicated to have a first diameter 17. The diameter indication is represented in the tube portion around the drive hub 18 of the peristaltic pump 13.

A tube 20 connects with the chamber 15 for removing gas from the liquid 21 through a first chamber outlet 22. The tube 20 feeds the removed gas at a second volume rate to the reservoir 10. The tube 20 connects with a portion 20a which is driven by a peristaltic pump 14 with a drive hub 19. The diameter 23 of the tube 20a is indicated around the drive hub 19 of the peristaltic pump 14. The diameter 17 is larger than the diameter 23 and this causes the second volume rate to be less than the first volume rate.

The peristaltic pumps 13 and 14 with their respective drive hubs 18 and 19 are linked in a single unit as indicated by line 24.

The tube 20 enters the top 42 of the reservoir 10 and returns the gas or air to the liquid reservoir 10 in this manner.

The substantially reduced liquid flow is directed from the chamber 15 to the reservoir 10 from a second outlet 25 at the base 41 of the chamber 15. This is represented by line 27 which is a tube 27 connecting the chamber 15 with the reservoir 10.

En route between the outlet 25 from the chamber 15 to the inlet 28 to the reservoir 10 the bubble reduced liquid flow is directed to a sensing element 29 of a flow cell 30. The inlet to the sensing element 29 is represented by tube 31 and the outlet is tube 32. These tubes are an integral part of the tube line 27. In this manner, substantially air, gas or bubble reduced liquid flow passes through the sensing element 29 and back to the reservoir 10 and is recycled to the chamber and reservoir in the manner described. Outlet liquid is indicated by droplets 33 into the reservoir 10. The tube 12 draws from the base 34 area of chamber 10 as indicated.

The sensing element 29 is an electrode for $CO_2$ measurement in the flow cell 30. The fluid sample stream through the flow cell 30 is indicated by arrow 35. The fluid in the reservoir 10 is an alkaline buffer for the sensing element 29 of the flow cell.

The sensing element 29 is part of a $CO_2$ electrode 36. The flow from tube 31 is directed into a chamber 37 which is mounted in front of the sensor 38 and behind a membrane 39. After passing through the chamber 37, the liquid exits through outlet tube 32.

The amount of flow through the system is controlled by the relative diameters of the tubes 17 and 23 and the restriction of flow through the electrode 36. The ideal volume flow rate is set so that the fluid level 40 in the chamber 15 is above the exit 26 from the tube 16. Simultaneously, a relatively steady state high dripping rate, namely, steady stream 33 is effected from the outlet tube 27 into the reservoir 10. In steady state operation the fluid level 40 fills the chamber 15 so that the gas laden liquid exits from the top of the chamber 15. Gas reduced liquid exits along tube 27.

The system maintains a relative bubble free liquid flow through tube 27 and is self-purging during initiation and start-up from a dry system and when replacing old buffer liquids with new liquids. The peristaltic pumps or drive wheels 18 and 19 are linked by a common drive shaft and a single motor. Different diameter pump tubes 17 and 23 can be used to facilitate and to effect the different volume rates. Effectively a single motor with two different diameter pump tubes 17 and 23 comprise the two peristaltic pumps.

Many variations of the invention are possible, each differing from the other in matters of detail only. For instance, although the gas, air or bubble removal from the liquid has been described with reference to alkaline buffers for flow cells, it is clear that the system can operate in other fluid flow paths of the chemical analyzer. The scope of the invention is to be determined solely by the appended claims.

I claim:

1. A liquid degassing system comprising a liquid reservoir, means for feeding liquid from the reservoir at a first volume rate and directing the liquid at the first volume rate to a chamber, a tube connected with the chamber for removing gas from the liquid through a first chamber outlet from the chamber, the tube feeding the removed gas to the reservoir at a second volume rate, the second volume rate being less than the first volume rate, and means for pumping the gas reduced liquid from a second chamber outlet from the chamber and directing the substantially gas reduced liquid to the reservoir wherein the means for directing the gas reduced liquid flow to the reservoir passes the liquid flow through a sensing element before entering the reservoir.

2. A system as claimed in claim 1 wherein the sensing element is an electrode of a flow cell and wherein the liquid in the reservoir is recycled to the chamber through the feeding means.

3. A system as claimed in claim 1 including means for self-purging the gas from the reservoir and chamber on initiation.

4. A system as claimed in claim 1 wherein a first volume rate is such that the gas reduced liquid outlet flow from the chamber into the reservoir is maintained at a relatively steady stream flow rate.

5. A system as claimed in claim 4 wherein the liquid level fills the chamber.

6. A system as claimed in claim 1 wherein the means for feeding a liquid at the first volume rate feeds from substantially close to the base of the reservoir into the base of the chamber, and wherein gas is removed from the top of the chamber, the tube feeding the removed gas into the top of the reservoir, and wherein the gas reduced liquid flow is directed from substantially close to the base of the chamber into the top of the reservoir.

7. A system as claimed in claim 6 wherein the feeding of liquid from the reservoir to the chamber is directed into the base of the chamber by a tube, the tube extending at least partly upwardly in the chamber towards the gas outlet.

8. A liquid degassing system comprising a liquid reservoir, means for feeding liquid from the reservoir at a first volume rate and directing the liquid at the first volume rate to a chamber, a tube connected with the chamber for removing gas from the liquid through a first chamber outlet from the chamber, the tube feeding the removed gas to the reservoir at a second rate, the second volume rate being less than the first volume rate, and means for pumping the gas reduced liquid from a second volume chamber outlet from the chamber and directing the substantially gas reduced liquid to the reservoir wherein the means for feeding liquid and for feeding removed gas includes peristaltic pump means, the pump means developing the first and second volume rates.

9. A system as claimed in claim 1 wherein there are first and second peristaltic pumps, the pumps being linked in operation.

10. A system as claimed in claim 9 wherein the means for feeding liquid to the chamber includes a tube, the tube about the first peristaltic pump having a larger diameter than the tube about the second peristaltic pump, the difference in diameter facilitating the difference in the first volume rate of liquid and second volume rate of liquid.

11. A liquid degassing system comprising a liquid reservoir, means for feeding liquid from the reservoir at a first volume rate and directing the liquid at the first volume rate to a chamber, a tube connected with the chamber for removing gas from the liquid through a first chamber outlet from the chamber, the tube feeding the removed gas to the reservoir at a second volume rate, the second volume rate being less than the first volume rate, and means for pumping the gas reduced liquid from a second chamber outlet from the chamber and directing the substantially gas reduced liquid to the reservoir, and wherein the means for feeding a liquid at the first volume rate of liquid feeds from substantially the base of the reservoir into the base of the chamber and wherein gas is removed from the top of the chamber wherein the means for directing the gas reduced liquid flow to the reservoir passes the liquid flow through a sensing element before entering the reservoir.

12. A system as claimed in claim 11 wherein the sensing element is an electrode of a flow cell.

13. A method of degassing a liquid system comprising feeding liquid from a reservoir at a first volume rate, directing the liquid at the first volume rate to a chamber, removing gas from the liquid through a first chamber outlet, feeding the removed gas to the reservoir at a second volume rate, the second volume rate being less than the first volume rate, pumping the gas reduced liquid from a second chamber outlet, and directing the substantially gas reduced liquid to the reservoir and including directing the gas reduced liquid flow to a sensing element before entering the reservoir.

14. A method as claimed in claim 13 including self-purging the gas from the reservoir and chamber on initiation.

15. A method as claimed in claim 13 wherein a first volume rate is such that a liquid level in the chamber is maintained above the inlet of liquid from the reservoir, and the gas reduced liquid outlet flow from the chamber into the reservoir is maintained at a relatively steady stream flow rate, and recycling liquid to the chamber through the feeding means.

16. A method as claimed in claim 15 including feeding liquid from the reservoir to the chamber into the base of the chamber.

17. A method as claimed in claim 15 wherein the liquid level fills the chamber.

* * * * *

UNITED STATES PATENT AND TRADEMARK OFFICE
CERTIFICATE OF CORRECTION

PATENT NO. : 4,915,713

DATED : April 10, 1990

INVENTOR(S) : Buzza, et al.

It is certified that error appears in the above-identified patent and that said Letters Patent is hereby corrected as shown below:

Column 2, line 26 reads:                should read:

--the umps being linked.--              --the pumps being linked.--

Signed and Sealed this

Fifth Day of November, 1991

Attest:

HARRY F. MANBECK, JR.

Attesting Officer                Commissioner of Patents and Trademarks